US009530417B2

(12) United States Patent
Kurniawati et al.

(10) Patent No.: US 9,530,417 B2
(45) Date of Patent: Dec. 27, 2016

(54) METHODS, SYSTEMS, AND CIRCUITS FOR TEXT INDEPENDENT SPEAKER RECOGNITION WITH AUTOMATIC LEARNING FEATURES

(71) Applicant: STMicroelectronics Asia Pacific Pte Ltd., Singapore (SG)

(72) Inventors: Evelyn Kurniawati, Singapore (SG); Sapna George, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 0 days.

(21) Appl. No.: 13/854,134

(22) Filed: Apr. 1, 2013

(65) Prior Publication Data

US 2014/0195232 A1 Jul. 10, 2014

Related U.S. Application Data

(60) Provisional application No. 61/749,094, filed on Jan. 4, 2013.

(51) Int. Cl.
*G10L 17/02* (2013.01)
*G10L 17/04* (2013.01)
*G10L 15/06* (2013.01)
*G10L 15/14* (2006.01)
*G10L 17/06* (2013.01)

(52) U.S. Cl.
CPC ............. *G10L 17/04* (2013.01); *G10L 15/063* (2013.01); *G10L 15/144* (2013.01); *G10L 17/02* (2013.01); *G10L 17/06* (2013.01)

(58) Field of Classification Search
None
See application file for complete search history.

(56) References Cited

U.S. PATENT DOCUMENTS 7,363,223 B2 * 4/2008 Chaudhari .............. G10L 17/22
704/246
8,560,316 B2 * 10/2013 Vogt ........................ G10L 17/06
704/234
8,612,224 B2 * 12/2013 Breslin ................... G10L 15/26
704/243

OTHER PUBLICATIONS

Kinnunen et al "An overview of text-independent speaker recognition: From feature to supervector" Speech Communication 2009.*
Preti et al "Confidence measure based unsupervised target model adaptation for speaker verification" Interspeech 2007.*
Kinnunen, Tomi et al., "An Overview of Text-Independent Speaker Recognition: from Features to Supervectors," Journal of Speech Communications, 30 pgs., vol. 52, Issue 1, Jan. 2010, USA.
Kinnunen et al., "Real-Time Speaker Identification and Verification," *IEEE Transactions on Audio, Speech, and Language Processing* 14(1):277-288, Jan. 2006.

(Continued)

*Primary Examiner* — Pierre-Louis Desir
*Assistant Examiner* — Yi-Sheng Wang
(74) *Attorney, Agent, or Firm* — Seed IP Law Group LLP (57) ABSTRACT

Methods and systems of text independent speaker recognition provide a complexity comparable to text dependent speaker recognition system. These methods and systems exploit the fact that speech is a quasi-stationary signal and simplify the recognition process based on this theory. The speaker modeling allows a speaker profile to be updated progressively with new speech samples that are acquired during usage over time by the speaker.

10 Claims, 5 Drawing Sheets

(56) References Cited

OTHER PUBLICATIONS

Kurniawati et al., "A Template Based Voice Trigger System Using Bhattacharyya Edit Distance," 12$^{th}$ Annual Conference of the International Speech Communication Association, Interspeech 2011, Aug. 28-31, 2011, pp. 889-892.
National Institute of Standards and Technology, "Speaker Recognition Evaluation," Sep. 3, 2009, retrieved from http://www.itl.nist.gov/iad/mig/tests/spk, 1 page.
National Science and Technology Council, "Speaker Recognition," Aug. 7, 2006, retrieved from http://www.biometrics.gov/Documents/speakerrec.pdf, 9 pages.
Reynolds et al., "Automatic Speaker Recognition: Recent Progress, Current Applications, and Future Trends," AAAS 2000 Meeting: Humans, Computers and Speech Symposium, Feb. 19, 2000, 36 pages.

\* cited by examiner

Speech Training Data → [MFCC Feature Vector] 402 → [Frame Clustering] 404 → [GMM Estimation] 406 → Speaker Profile

400

FIG. 4 gmm1, gmm2, gmm3, gmm4, gmm5, gmm6 — Word registration

METHODS, SYSTEMS, AND CIRCUITS FOR TEXT INDEPENDENT SPEAKER RECOGNITION WITH AUTOMATIC LEARNING FEATURES

PRIORITY CLAIM

This application claims priority to provisional patent application No. 61/749,094, filed 4 Jan. 2013, which is incorporated herein by reference.

TECHNICAL FIELD

The present disclosure relates generally to speech recognition systems, and more specifically to time scalable text independent speech recognition with automatic learning features.

BACKGROUND

Speaker recognition is a biometric modality that uses a person's voice for identification purposes. Speaker recognition is different from speech recognition where transcription of the spoken word is desired instead of the identity of the speaker. Before a speaker recognition system can be used, it must go through a training procedure where speech samples from the user are introduced to the system to build a speaker model. In the testing phase, the user or speaker's speech is compared to the speaker model database and the one which closely resembles it is identified.

Figure 1:
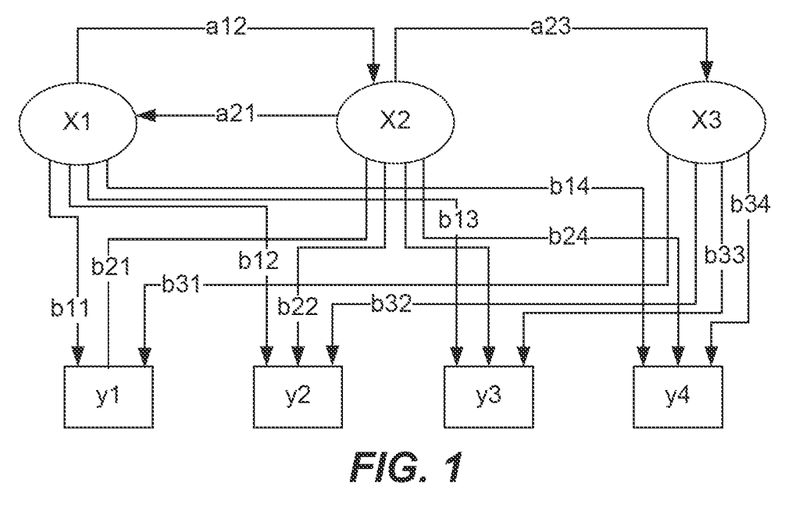
FIG. 1 shows the structure of a Hidden Markov Model of a system.

There are two main types of speaker recognition. The first type is text dependent speaker recognition. In this type of speech recognition, the user or speaker needs to utter a specific keyword or phrase to be accepted by the system. The keyword or phrase can either be a password or a prompted phrase. These types of speaker recognition systems have a strong control over user input and need user cooperation to perform the identification process. Most text dependent speaker recognition system uses Hidden Markov Model (HMM) which provides a statistical representation of the individual's speech. FIG. 1 shows the structure of a typical HMM. The training process requires the user to say the keyword or phrase numerous times to build the statistical model. Another method utilized in speaker dependent systems is to use template matching where a sequence of feature vectors is built from a fixed phrase that is spoken by the speaker or user to thereby generate a template. The verification of the speaker can be done by using Dynamic Time Warping (DTW) to measure the similarity between the test phrase and the template.

The second type of speaker recognition system is text independent speaker recognition. Text independent speaker recognition systems allow a user to say anything he or she wants, and the system should then be able to perform the identification of the speaker. Sufficient speech samples from the speaker are needed in such systems in order to make accurate recognition of the speaker given the system has no prior or learned knowledge of what is being spoken by the speaker. The primary advantage of text independent speaker recognition systems is that the process can be done without user cooperation (e.g., no keyword or phrase need be spoken). Various forms of neural networks can be trained to perform the task of text independent speaker recognition, but the de facto reference method is the Gaussian Mixture Model (GMM) to represent the speaker model. Usually this GMM is adapted from a Universal Background Model (UBM) using an adaptation method such as maximum a posteriori (MAP). In recent years, Support Vector Machine (SVM) has been found to be the most robust classifier in speaker verification, and its combination with GMM has successfully increased the accuracy of text independent speaker recognition systems.

There is a need for improved methods and circuits for text independent speaker recognition in lower power applications such as in battery powered devices like smartphones.

SUMMARY

Text dependent speaker recognition systems have a lower degree of complexity than do text independent speaker recognition systems because of the prior knowledge of the phrase to be used for identification. Text independent speaker recognition systems, however, are more desirable due to flexibility and unobtrusiveness of such systems. Many methods have been proposed to reduce the complexity of text independent speaker recognition systems, such as, for example, by using pre-quantization or speaker pruning approaches. Embodiments of this disclosure seek to address the complexity issue of text independent speaker recognition by imitating the concept of text dependent version.

Figure 2:
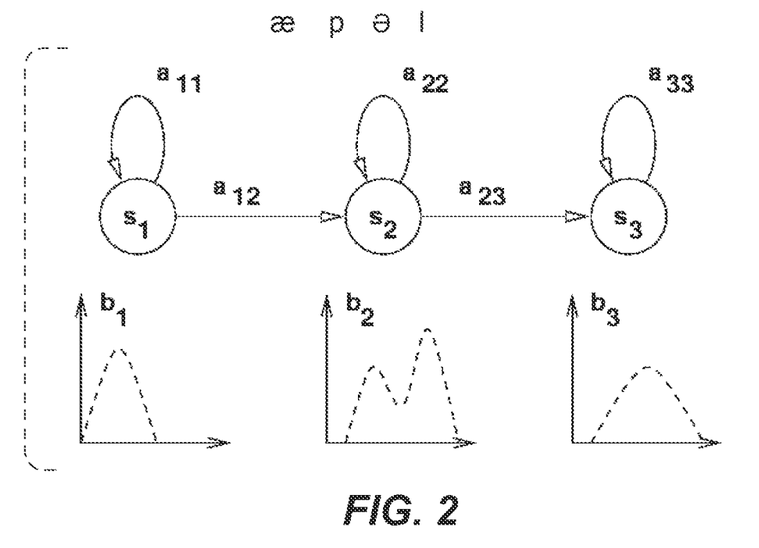
FIG. 2 shows a training process of text dependent speaker recognition where multiple utterances of the word "apple" are needed to construct the statistics of the Hidden Markov Model (HMM) and thereby generate the speaker model or profile.

FIG. 2 shows the training process of a text dependent speaker recognition system. Multiple utterances of the keyword or phrase are needed to build a reliable Markov Chain. For illustration purposes, in FIG. 2, the keyword "apple" is represented by a model including three states. The training process searches for the transition probability between states (a11, a12, etc.) and each state statistic itself. Each state is usually represented by either a single Gaussian with full a co-variance matrix, or a Gaussian Mixture with diagonal covariance matrix. In FIG. 2, b1 to b3 represents the Gaussian Mixture parameters, which consist of means, variances and mixture weights. The training process utilized to find these parameters will be understood by those skilled in the art and will not described in detail herein, but the final results of such a process should maximize the likelihood of the trained word being generated by the model.

In embodiments of the present disclosure, a text independent speaker recognition system is built using the same structure as a text dependent HMM. Unfortunately in such a situation, the cooperation of the speaker during testing is not available so the speaker can say any word he or she desires and is not limited to specific keyword or phrase. It is also impossible to train the Markov chain of the HMM because there is no transcribed speech from the speaker that may be utilized to train the model. Embodiments of the present disclosure solve this problem by modelling a speaker's speech into a smaller unit of speech. A speaker's speech is clustered, without the need of transcription, into sixty four (64) distinct units that represent the acoustic space of the speaker, or in other words, the speaker's model. Each cluster of this approach can be thought of as one state of the Markov chain, even though there is no knowledge on what word would be represent by that state.

Figure 3:
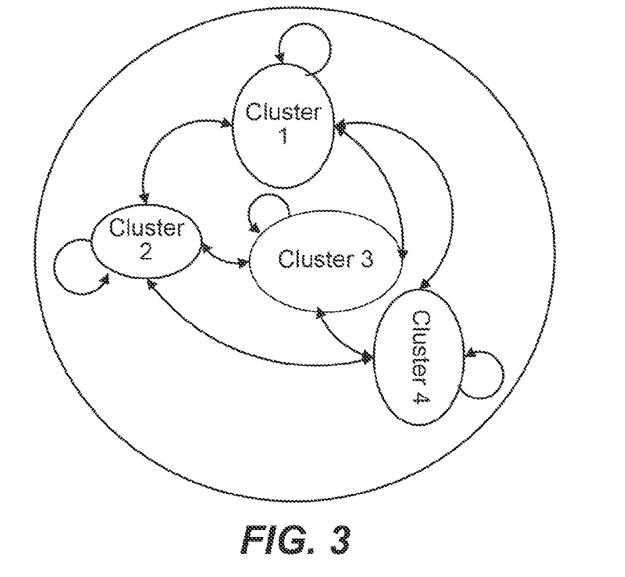
FIG. 3 shows a subset of the speaker model of FIG. 2 showing only 4 clusters.

In addition, it is necessary to construct the transition probability between the 64 clusters or states. It is impossible to find the transition probability without the context of the word or phrase being modelled. Embodiments of the present disclosure solve this problem by exploiting the fact that speech is a quasi-stationary signal. Following this assumption, the transition probability of a state to itself is set to be higher than for a state to other states. These numbers are uniform for all the states in the speaker model. FIG. 3 illustrates a subset of this type of speaker model. Contrary to FIG. 2, in FIG. 3 there is no association of each state or cluster with a particular sound or phoneme.

Text dependent speaker recognition systems rely on the speaker saying the predetermined phrase or a prompted phrase to decide the identity of the speaker. Such systems have prior knowledge on how the user would say a particular phrase, and this knowledge is generally captured using the HMM. Text independent speaker recognition on the other hand collects samples of a speaker's voice, in which the speaker can say anything he or she wants. The system will then build a profile from the collected speech and compare the profile to the list of profiles available in its database. This task is more computationally intensive as the system is required to process significantly more speech samples compared to the text dependent counterpart. The advantage of text independent speaker recognition, however, is that recognition can be done without the user's cooperation and in a discreet manner. Embodiments of the present disclosure provide new methods of text independent speaker recognition with a complexity comparable to a text dependent speaker recognition system. Embodiments utilize these new methods to exploit the fact that speech is a quasi-stationary signal and simplifies the recognition process based on this theory. The modeling allows a speaker profile to be updated progressively with new speech samples that are acquired during usage over time of an electronic device implementing the modelling.

DETAILED DESCRIPTION

Embodiments of the present disclosure provide new methods to reduce the complexity of a text independent speaker recognition system by reusing the structure of a text dependent speaker recognition system. Instead of comparing the input speech of a user with a template path, only the probability of each cluster is calculated. The transition probability is substituted with two constants to represent transition to the same cluster and to a different cluster. With this approach, only the log likelihood (Loglk) variable per cluster needs to be stored at each iteration, namely whenever a new frame of speech is received. No other information needs to be retained for future processing, which results in memory savings when implementing embodiments of the present disclosure. Contrary to conventional methods of text independent speaker recognition, which require enough speech samples before the system is able to make decisions, embodiments of the present disclosure enable decisions to be made at any point in time by looking at the current log likelihood Loglk value. The confidence of the result can be set proportional to the difference in likelihood between the winning speaker and the next highest result. When confidence is high, the speech is automatically used to improve the speaker profile by performing further training processes.

In the following description, certain details are set forth in conjunction with the described embodiments to provide a sufficient understanding of the embodiment. One skilled in the art will appreciate, however, that the embodiment may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present embodiment.

Embodiments of the present disclosure can be combined with various types of front end speech processing as is the disclosed embodiments are independent of the features used for the recognition process. For example, simple front end processing of speech signals using Mel Frequency Cepstral Coefficients (MFCC) as features may be utilized and are utilized by way of example in discussing the below described embodiments of the present disclosure.

Figure 4:
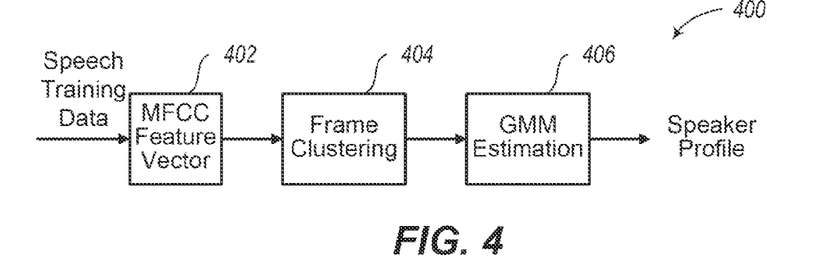
FIG. 4 is a block diagram of a process used to build a speaker profile according to one embodiment of the present disclosure.

Embodiments of the present disclosure include a training process for building the acoustic space of the speaker model as shown in FIG. 4. The speech data from the speaker are processed per frame, and the Mel Frequency Cepstral Coefficients (MFCC) for each frame are extracted. These MFCC coefficients are then clustered into 64 groups depending on Euclidian distance. Any clustering methods can be applied for this purpose, one of which is the K-means clustering method, as will be appreciated by those skilled in the art. Each of these clusters is then modelled using Gaussian Mixture, and the results constitute the speaker profile. Such a speaker profile is built for each of the registered speakers.

During usage of the electronic device over time, speech from one of the registered but unknown speakers is received and the system will choose which of the speaker profiles that speech most likely belongs to. Embodiments test each of the speaker profiles and find the probability through the following operations. First, one a per-frame-basis the MFCC of the speech signal frame is extracted and then the probability of that frame belonging to each of the clusters is calculated. A final probability is calculated by taking into account the transition from the previous cluster. This process is then repeated for the next frame of the speech signal.

Figure 5:
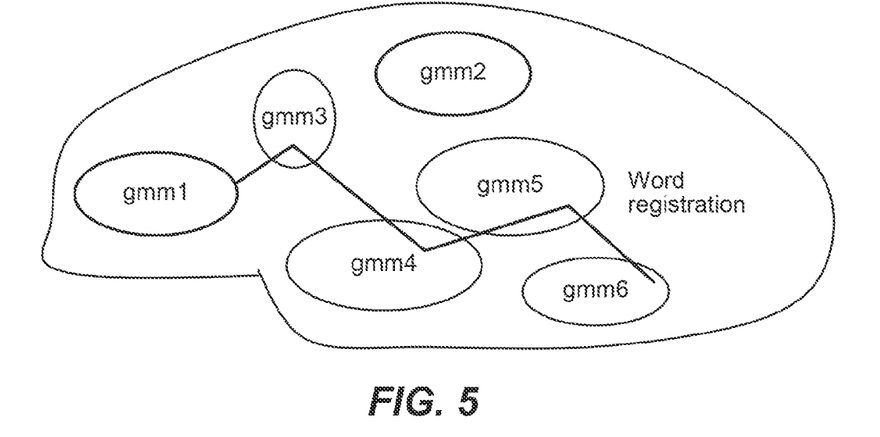
FIG. 5 shows an example of a template path for a text dependent speaker recognition system.

This process is similar to text dependent speaker recognition, but since there is no fixed word or phrase for the recognition, the template path sequence between clusters does not exist. FIG. 5 shows an example of a template path for a text dependent speaker recognition system. This path represents certain words being said, and for a text dependent speaker recognition system, the path will be compared with the speech from an unknown speaker. In embodiments of the present disclosure, the text independent speaker recognition system does not compare the template path to any path, but only generates the best sequence which results in the highest probability value.

There is one issue that must be dealt with, and that is the transition probability. The transition probability of a template path is generated from multiple utterances of the same word, which is not available for text independent speaker recognition systems. Embodiments of the present disclosure rely on only two transition probability values: 1) the transition probability of a given cluster to itself; and 2) the transition probability of the given cluster to another cluster. Since speech is a quasi-stationary signal, the value of the former probability is much higher than the later probability. The following pseudo code explains the steps in deriving the final probability value:

```
/*----Initialization----*/
T = number of frames of test speech sample;
for(i=0;i<T;i++)
    for(j=0;j<Number_of_cluster ;j++)
        loglk[i]G]=-1000000000000000000.0;
for(i=0;i<Number_of_cluster;i++)
{
        likelihood = GMM_likelihood( input, i, 0, speaker);
        loglk[0][i]=logx(likelihood);
}
/*----Recursion-----*/
for(t=1;t<T;t++)
{
    for(j=0;j< Number_of_cluster;j++)
    {
    Initialize maximum_value to a very small number;
    for(i=0;i< Number_of_cluster;i++)
    {
        if(i!=j)   //moving from cluster i to cluster j
            value = loglk[t-1][i]+logx_transition;
        else       //remain in same cluster
            value = loglk[t-1][i]+logx_selfTransition;
        if(value > maximum_value)
            maximum_value=value;
    }
        likelihood = GMM_likelihood( input, j, t, speaker );
        loglk[t][j]=logx(likelihood) + maximum_value;
    }
}
/*-----Find highest loglikelihood-----*/
Result = -1000000000000000000.0;
for(i=0;i< Number_of_cluster;i++)
    {
        If (loglk[T-1][i] > Result)
            Result = loglk[T-1][i];
    }
```

The function GMM_likelihood(input, j, t, speaker) in the above pseudo code computes the probability of the "input" frame at time "t" belonging to the "speaker" cluster number "j". This is calculated per Gaussian component by the following equation:

$$f(x; \mu, \sigma^2) = \frac{1}{\sigma\sqrt{2\pi}} e^{-\frac{(x-\mu)^2}{2\sigma^2}} \quad \text{Eqn. 1}$$

where x is the input signal (in this case, the MFCC of the input signal), $\mu$ and $\sigma^2$ are the mean and variance of the Gaussian distribution. The results per component are finally combined as:

$$\text{GMM\_likelihood} = \sum_{m=0}^{M-1} w_m f(x; \mu_m \sigma_m^2) \quad \text{Eqn. 2}$$

where M is the number of mixtures and $w_m$ is the mixture weight.

The simplification in the method implemented in the above pseudo code comes from the two variables "logx_transition" and "logx_selfTransition" which contain the log likelihood of the transition to a different state and to the same state, respectively. In text dependent speaker recognition, these values are square matrixes representing the state transition probability derived during the training process with transcribed speech. Since we do not have that, the values used are logx(0.95) for self-transition and logx(0.05) for the transition to another cluster, emphasizing the point that in human speech it should be more likely for a speech to maintain its current state or cluster than it is to transition to another state or cluster due to the quasi-stationary characteristics of human speech, as mentioned above.

The pseudo code above can be distinctively separated into three separate portions: 1) initialization; 2) processing; and 3) ending state. This is an advantage for real time application as the initialization and the ending state only needs to be performed once, that is before and after the frame loop. The main loop (noted with the "recursion" comment) is what's being performed on each frame. It utilizes a dynamic programming concept to find the highest probable state sequence. The variable "loglk[t][j]" holds the best probability value at time t, calculated from t=0, and ending at state j. In one embodiment, only one dimensional variable loglk[j] is required since there was no need to keep the value for the time that has already passed. Each speaker will have their own loglk[j] variable and the speaker with the highest value is chosen as the output speaker.

Figure 6:
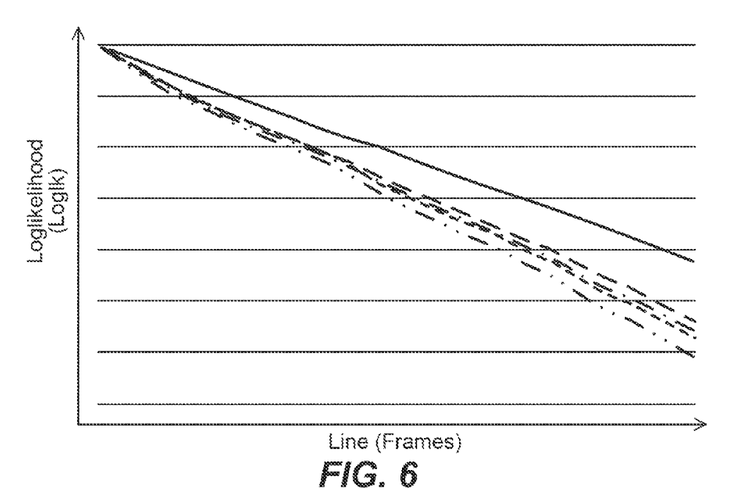
FIG. 6 is a graph showing the best path probability (i.e., highest Loglk value) for each speaker.

The more speech samples available, the more reliable the result. FIG. 6 shows the best path probability for each speaker. The x-axis is the timeline in terms of frame and the y-axis the loglikelihood (Loglk). The decision of the winning speaker can be made at any point in time. The more it progresses, the more distinct the differences are between the speakers, and the confidence level is higher for choosing the winning speaker. The difference between the best probability and the second best can be made as a security setting. For applications which is more tolerant to error, this threshold can be made small so the decision can be made quicker on who is the output speaker. For applications requiring reliability, however, this threshold should be set higher such that only when the system confidence is high enough with the output (difference with the second winning speaker is high), then the output speaker can be decided. A reset of the process illustrated in the above pseudo code needs to be done after a certain period of time, and the most appropriate time to do such a resent is after a sufficient period of silence, meaning no speech is observed.

Figure 7:
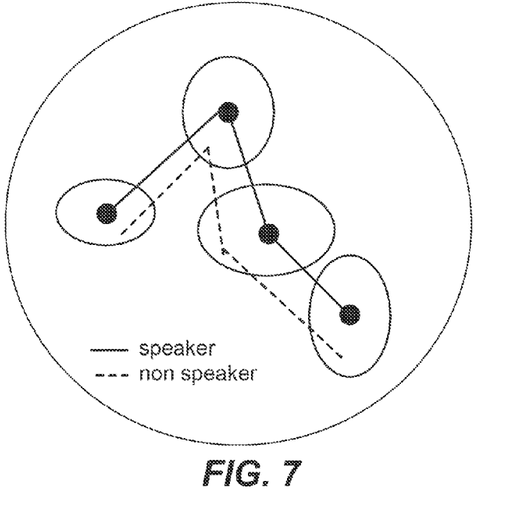
FIG. 7 shows an embodiment where the path of a speaker will be closer to GMM means than the path of a non-speaker, resulting in a higher log likelihood Loglk value.

FIG. 7 illustrates the operation of the process illustrated in the above pseudo code. The solid line path represents the speech of the correct speaker. The solid line rests nearer to the black dot (representing the mean of the Gaussian distribution of each cluster), and hence would results in higher probability value compared to the non-speaker counterpart represented by the dashed line path. As previously mentioned, the system does not need to know about prior speech (i.e., what was being said previously) so the path can be immediately deleted after the probability value is calculated.

Embodiments of the present disclosure can be combined with various front end speech processing circuitry and approaches as processes according to the described embodiments are independent of the features used for the recognition process. An embodiment utilizing simple front end speech processing using MFCC as features will now be described in more detail with reference to FIG. 8.

Figure 8:
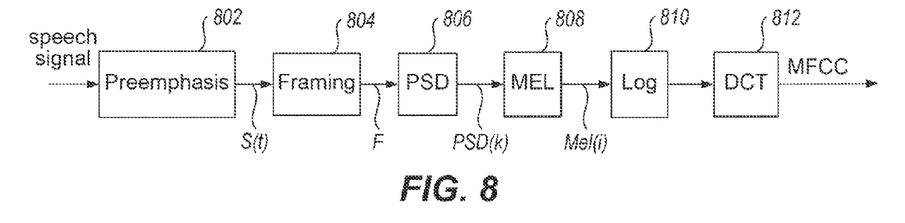
FIG. 8 shows the block diagram illustrating a process of extracting MFCC features used in one embodiment of the present disclosure.

The analysis of a generated speech signal and speaker recognition utilizing that signal are not done on the speech signal itself, but on features derived from the speech signal, as will be appreciated by those skilled in the art. An incoming speech signal goes through this front end processing and FIG. 8 is a functional block diagram showing one embodiment of this processing 1100 which extracts MFCC coefficients from the input speech signal.

A preemphasis circuit 1102 performs preemphasis on the speech signal (i.e., digital samples of analog speech signal) using the following equation:

$$S(t) = S_{in}(t) - 0.96 S_{in}(t-1) \quad \text{Eqn. 3}$$

where Sin is the input signal and t is the time index.

Framing of the preemphasized speech signal from the circuit 1102 of performed by framing circuitry 1104 in which processing of the speech signal is done per frame, where each frame in one embodiment includes 320 digital samples in length and progresses by 160 samples to the next frame, meaning a 50% overlap of adjacent frames. At a 16 KHz sampling rate, this corresponds to a total duration of 20 ms per frame, with successive frames progressing by 10 ms each. The framing circuitry 704 applies the Hamming window to each frame, following the equation:

$$w(n) = 0.54 - 0.46 \cos\left(\frac{2\pi n}{N-1}\right) \quad \text{Eqn. 4}$$

where N is the frame size (in this case 320) and n is the time index of this window. Power spectral density (PSD) of the framed signal from the framing circuitry 1104 is performed by PSD circuitry 1106, which applies the Discrete Fourier Transform (DFT) to analyze the frequency content of the short duration audio signal of each frame and calculates the Power Spectral Density (PSD) as follows:

$$PSD(k) = \left| \sum_{t=0}^{FFTlen-1} S_{win}(t) \cdot e^{-jtk \frac{2\pi}{FFTlen}} \right|^2 \quad \text{Eqn. 5}$$

Time warping circuitry 1108 that performed the MEL warping (i.e., calculation of the Mel Frequency Cepstral Coefficient MFCC for each frame) is approximated by the following equation:

$$\text{mel}(f) = 2595 \log_{10}(1 + f/700) \quad \text{Eqn. 6}$$

Figure 9:
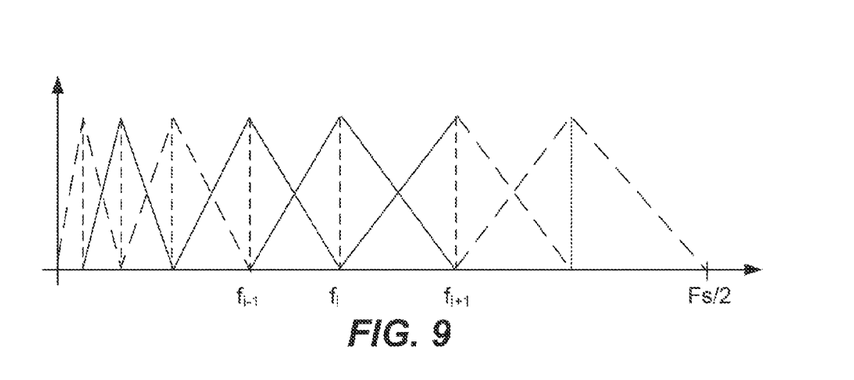
FIG. 9 is a graph illustrating the triangular filter used on the PSD values calculated during the extraction of MFCC features to obtain each Mel frequency bin value according to one embodiment.

The time warping circuitry 1108 utilizes a triangular filter on the calculated PSD for each of the frames from Eqn. 5 and this triangular filter is shown in FIG. 9. The output of the circuitry 1108 is calculated as follows:

$$Mel(i) = \sum_{k=0}^{FFTlen/2} W_{i,k} PSD(k) \quad \text{Eqn. 7}$$

where i is the Mel frequency bin, W is the weight of the triangular filter.

Finally, log circuitry 1110 and Discrete Cosine Transform (DCT) circuitry 812 take the log and perform the DCT to get the final MFCC output as follows:

$$MFCC(j) = \sum_{i=1}^{Q} \log\left(Mel(i) \cos\left(\frac{j\pi}{Q}(i-0.5)\right)\right) \quad \text{Eqn. 8}$$

The following described embodiments utilize the MFCC values calculated by Eqn. 8 for each frame of the speech signal, and in one embodiment twenty four (24) MFCC were used. A training process 1000 for generating the speaker profile will now be described in more detail with reference to FIG. 10. The speaker profile is a representation of the speaker acoustic space. In this embodiment, 64 clusters of a Gaussian Mixture Model are used, made from user speech as depicted in FIG. 4. After going through the front end processing (step 1002), the features are clustered using a k-means algorithm as follows. For initialization, 64 vectors are randomly chosen as the initial centroids for each of the cluster. Next a nearest neighbor search is performed in which each of the training vectors (i.e., the vector for each frame from the FE processing step 1002) is grouped with the centroid that has the closest Euclidian distance to that feature.

Within each centroid, a new mean is calculated taking accounts all the training vectors that have been grouped within that cluster. The new mean is set as the new centroid for the cluster. These operations are then repeated until the distortion falls under a specified threshold. Each of the clusters is then represented by a Gaussian Mixture Model.

Figure 10:
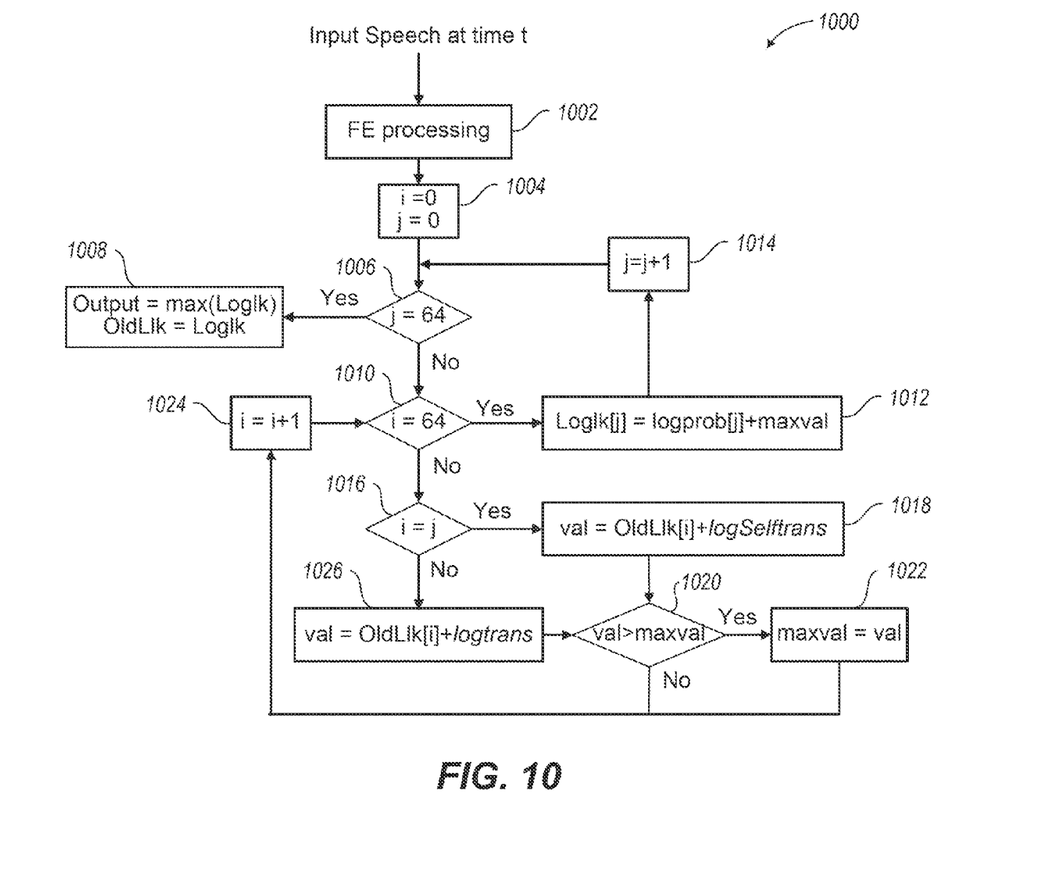
FIG. 10 is a flowchart of a decoding process executed per frame of the speaker speech signal that is to be calculated per speaker model.

FIG. 10 illustrates the decoding process per audio frame that has to be calculated per speaker model. The speaker with the maximum output value is chosen to be output speaker. Note that with this scheme, only the variable Loglk is needed per speaker, as it represents the probability of the speech at the corresponding cluster. No information about the path sequence is needed. The output speaker can be decided at any point in time.

When enough speech is obtained during the decoding process and the confidence level to choose a particular output speaker is above a predetermined threshold, the speech samples are used to perform further adaptation to the speaker profile, following the training process described above. The only difference is that the initial centroids are not random, but follow the current clusters.

Embodiments of the present disclosure provide new methods and systems to reduce the complexity of text independent speaker recognition system by reusing the structure of a text dependent speaker recognition system. Instead of comparing the input speech from a speaker with a template path, only the probability of each cluster is calculated. The transition probability is substituted with two constants to represent transition to the same cluster and transition to a different cluster. In these embodiments, only the log likelihood (loglk) variable per cluster needs to be stored at each iteration, which is whenever a new frame of speech is received. No other information needs to be retained for future processing, which results in memory savings. Contrary to conventional methods of text independent speaker recognition which requires enough speech sample before the system is able to make the decision, this invention enables the system to make the decision at any point in time by looking at the current loglk value. The confidence of the result can be set proportional to the difference in likelihood between the winning speaker and the next highest result. When confidence is high, the speech is automatically used to improve the speaker profile by performing further training process.

Figure 11:
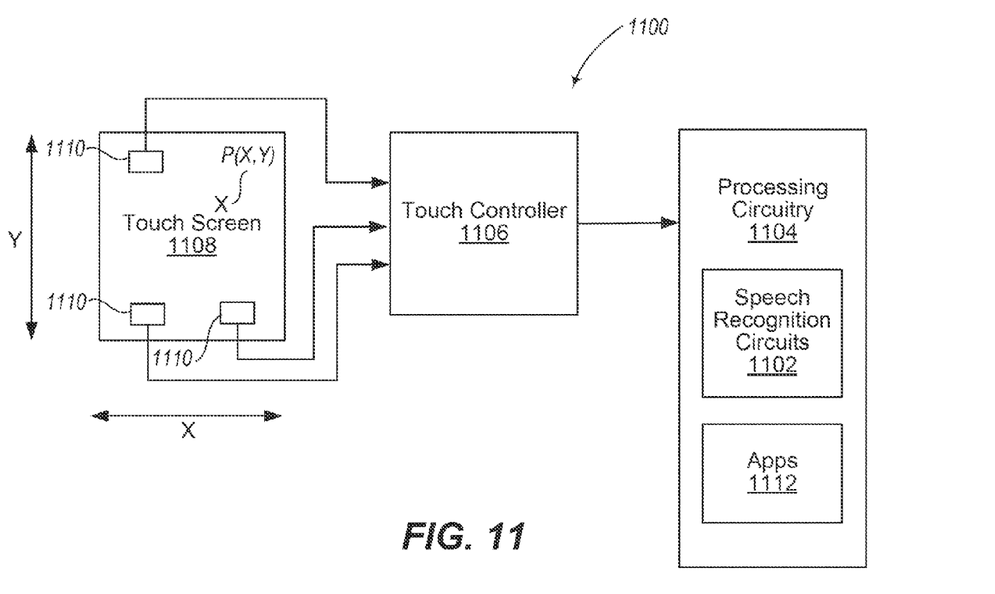
FIG. 11 is a functional block diagram of an electronic device including speech-recognition circuitry contained in processing circuitry according to one embodiment of the present disclosure.

FIG. 11 is a functional block diagram of an electronic device 1100 including speech-recognition circuitry 1102 contained in processing circuitry 1104 according to one embodiment of the present disclosure. The speech recognition circuitry 1102 corresponds to circuitry and/or software that executes the speaker dependent voice recognition algorithms described above with reference to FIGS. 1-7. The processing circuitry 1104 may be any suitable processing circuitry, such as a microprocessor where the electronic device 1100 is a personal computer or an applications processor where the electronic device is a smartphone or tablet computer. Similarly, the touch controller 1106 may include any suitable digital and/or analog circuitry to perform the desired functions of the controller.

The electronic device 1100 includes a touch controller 1106 that detects the presence of touches or touch points P(X,Y) and gestures including such touch points on a touch screen 1108 that is coupled to the controller. The touch screen 1108 has a number of touch sensors 1110 positioned on the touch screen to detect touch points P(X,Y), with only three touch sensors being shown merely to simplify the figure. The touch controller 1106 controls the touch screen 1108 to detect a user's finger, stylus, or any other suitable device, all of which will collectively be referred to as a "user device" herein. The detection of the user device at a particular location on the touch screen 1108 is defined as a touch point P(X,Y) on the touch screen. An X-axis and Y-axis are shown in FIG. 1, with the X coordinate of a touch point P(X,Y) corresponding to a point along the X-axis and the Y coordinate to a point along the Y-axis. The touch sensors 1110 generate corresponding sensor signals responsive to a touch point P(X,Y) and provide these signals to the touch controller 1108 for processing. The touch sensors 1110 are typically contained in some sort of transparent sensor array that is part of the touch screen 1108, the detailed structure of which is understood by those skilled in the art and thus will not be described herein. The number and location of the touch sensors 1110 can vary as can the particular type of sensor, such as ultrasonic, resistive, vibration, or capacitive sensors.

The processing circuitry 1104 is coupled to the touch controller 102 and is operable to execute applications or "apps" 812 designed to perform a specific function or provide a specific service on the electronic device 1100. Where the electronic device 1100 is a cellular phone or a tablet computer, for example, the applications 812 can include a wide variety of different types of applications, such as music applications, email applications, video applications, game applications, weather applications, reader applications, and so on. The touch controller 1106 reports touch information to the applications 812, which operate in response thereto to control operation of the application and/or the electronic device 1100.

The electronic device 1100 can be any kind of suitable electronic device or system. The device 1100 need not include the touch screen 1108 and can include additional components not expressly illustrated in FIG. 8. For example, the electronic device 1100 could be a personal computer system, desktop or laptop, a television, a home-theater system, a smart appliance, a vehicle such as a car or truck where the algorithm is used in lieu of a key to access, activate, and deactivate the vehicle, a security system that provides or denies the speaker access to a facility, and so on.

In one embodiment, the electronic device 1100 operates in a sleep or low-power mode of operation and the speaker dependent voice recognition algorithm executes during this mode to detect the utterance of the code phrase by an authorized user or users. The low-power mode is a mode of operation that is common in electronic devices in which at least some of the electronic components in the device are powered down or placed in an alternate state to reduce the power consumption of these components and thereby reduce the overall power consumption of the electronic device. In response to detecting the code phrase, the electronic device 1100 is then "activated" or leaves the low-power mode of operation. For example, where the device 1100 is a smart phone, when the algorithm detects the utterance of the code phrase by an authorized user the home screen or some other screen is then displayed to give the speaker access to and allow him or her to operate the device.

One skilled in the art will understood that even though various embodiments and advantages have been set forth in the foregoing description, the above disclosure is illustrative only, and changes may be made in detail, and yet remain within the broad principles of the embodiment. For example, some of the components described above may be implemented using either digital or analog circuitry, or a combination of both, and also, where appropriate, may be realized through software executing on suitable processing circuitry. The code phrase may be in any language, not just English, and could even be gibberish or a random sequence of sounds or a sound desired defined by the user. Therefore, the present disclosure is to be limited only as defined by the appended claims and any such later-introduced claims supported by the present disclosure.

What is claimed is:

1. A method of text independent speaker recognition, comprising:
    extracting feature vectors from initial frames of speech generated responsive to text-independent speech from a user;
    clustering the extracted feature vectors to generate a plurality of clusters;
    modelling each of the plurality of clusters as a Gaussian Mixture Model that collectively form a speaker profile for the user;
    setting a different-state transition probability and a same-state transition probability for each of the Gaussian Mixture Models, the same-state transition probability having a much greater value than the different-state transition probability;
    capturing additional frames of speech from additional text-independent speech from a speaker;
    extracting feature vectors from the additional frames; and
    determining likelihoods that each of the additional frames belongs to each of the Gaussian Mixture Models based on the same-state and different-state transition probabilities, wherein the determining likelihoods includes, for each additional frame of speech, determining a log likelihood (loglk) variable for each cluster to determine the probability that the additional frame of speech belongs to that particular cluster; and determining whether the speaker is an authorized user from the determined likelihoods.

2. The method of claim 1 wherein setting a different-state transition probability and a same-state transition probability for each of the Gaussian Mixture Models comprises setting the different-state transition probability between Gaussian Mixture Models to a value of 0.05 and setting the same-state transition probability for each Gaussian Mixture Model to a value of 0.95.

3. The method of claim 1 wherein determining whether the speaker is an authorized user from the determined likelihoods comprises is taken at any point in time by selecting the speaker having the highest value of the loglk variable from among a plurality of loglk variables for a plurality of speakers.

4. The method of claim 3 wherein a confidence value can be calculated by evaluating a difference between loglk variables for two speakers having the highest loglk variables.

5. The method of claim 4 wherein the confidence value can be the set as a threshold to accept or reject a speaker, and the threshold value is based on a desired reliability of the system.

6. The method of claim 4 wherein the value of the loglk variable for each speaker is reset to zero upon encountering a period of silence in the frames of speech.

7. The method of claim 4 wherein the value of the loglk variable is reset upon encountering a period of silence in the frames of speech.

8. The method of claim 7 wherein the Gaussian Mixture Model of each of the clusters is continuously updated using frames of speech that have high confidence values to belong to the selected speaker.

9. The method of claim 1, wherein extracting feature vectors from frames of speech generated responsive to text-independent speech from a user comprises generating a Mel Frequency Cepstral Coefficient (MFCC) for each frame.

10. The method of claim 1, wherein clustering the extracted feature vectors to generate a plurality of clusters that collectively represent a speaker profile comprises clustering the feature vectors using a K-means clustering algorithm.

* * * * *